United States Patent [19]
Bellisio et al.

[11] 3,733,779
[45] May 22, 1973

[54] STRIPPING OF SULFUR DIOXIDE FROM GAS STREAMS BY USE OF N-ALKYL LACTAMS

[75] Inventors: Arthur A. Bellisio, Huntington Station, N.Y.; Hippocrates G. Psyras, Berkeley Heights; Marvin M. Fein, Westfield, both of N.J.

[73] Assignee: GAF Corporation, New York, N.Y.

[22] Filed: Apr. 17, 1972

[21] Appl. No.: 244,766

Related U.S. Application Data

[63] Continuation-in-part of Ser. No. 872,775, Oct. 30, 1969.

[52] U.S. Cl. .................................... 55/73, 423/242
[51] Int. Cl. .................................................. B01d 53/14
[58] Field of Search ........................... 55/56, 68, 73; 423/242, 243

[56] References Cited

UNITED STATES PATENTS

| | | | |
|---|---|---|---|
| 3,103,411 | 9/1963 | Fuchs | 23/2 |
| 3,324,627 | 6/1967 | Kohrt | 55/32 |
| 3,492,788 | 2/1970 | Hochgesand et al. | 55/68 |
| 3,553,936 | 1/1971 | Little et al. | 55/73 |

*Primary Examiner*—Charles N. Hart
*Attorney*—Walter C. Kehm et al.

[57] ABSTRACT

Sulfur dioxide is stripped from a gas stream by N-alkyl lactam, particularly an N-lower alkyl pyrrolidone, e.g., N-methyl pyrrolidone, sufficiently to permit the non-polluting discharge of the gas stream to the atmosphere. Gas streams containing from about 0.05 percent to about 10 percent sulfur dioxide by volume can thus be passed at a gas mass flow velocity of 200–3,000 lbs/hr/ft$^2$ through an N-alkyl lactam-containing contacting zone of 5–85 ft in length, to reduce the sulfur dioxide content thereof to less than about 250 ppm, advantageously to less than 100 ppm, or even 50 ppm, prior to discharge to the atmosphere. Gas streams having SO$_2$ contents of from about 0.01 percent to about 50 percent by volume can thus be treated to achieve at least about 90 percent SO$_2$ removal by volume, desirably at least about 95 percent, and advantageously at least about 98 percent removal. Gas temperatures of about 0°–75°C, preferably about 35°–65°C, are employed. Lactam entrained in the gas stream discharged from the contacting zone is conveniently recovered in a water scrubbing zone. Lactam from the contacting zone and lactam in water removed from the scrubbing zone can conveniently be recovered in a distillation zone by heating to 100°–200°C. The lactam recovered can be recycled to the contacting zone, and the SO$_2$ stripped from said lactam can be conveniently recovered for non-polluting disposal or use.

36 Claims, 1 Drawing Figure

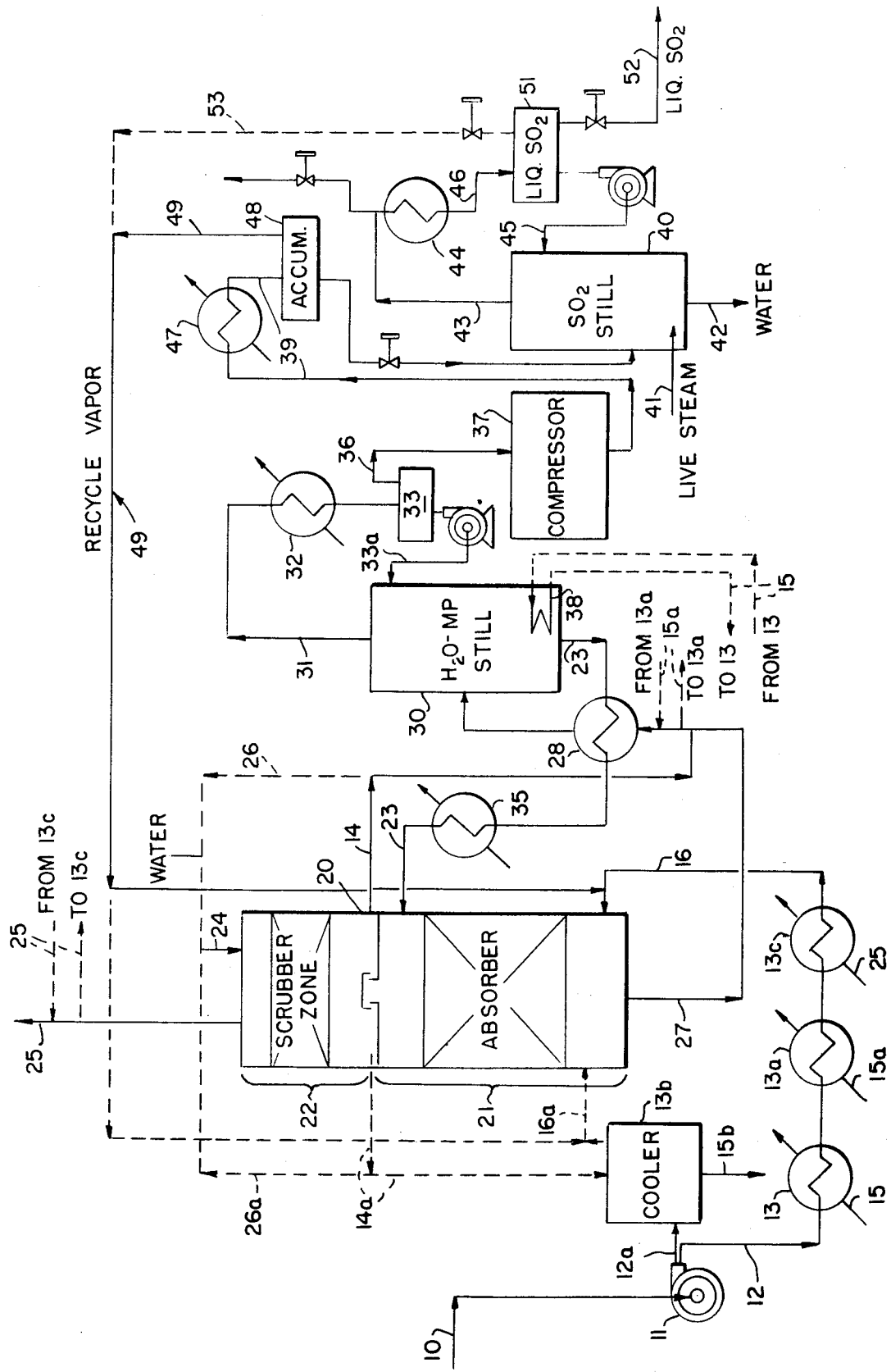

STRIPPING OF SULFUR DIOXIDE FROM GAS STREAMS BY USE OF N-ALKYL LACTAMS

CROSS-REFERENCE TO RELATED APPLICATION

The subject application is a continuation-in-part of applicants' co-pending application, Ser. No. 872,755, filed Oct. 30, 1969, entitled "REMOVAL OF SULFUR DIOXIDE USING N-ALKYL LACTAM."

BACKGROUND OF THE INVENTION

1. Field of the Invention

The present invention relates to the stripping of sulfur dioxide from a wet or dry gas stream. More particularly, it relates to the stripping of sulfur dioxide impurities sufficiently to permit the non-polluting discharge of the treated gas stream to the atmosphere.

2. Description of the Prior Art

While the removal of sulfur dioxide from stack gases and similar gases containing this gaseous component has always been a problem, the awareness of this problem has become more acute in recent years with the increasing concern about air pollution. Thus, with the increased utilization of high sulfur-containing fuels, there has been an ever increasing pollution of the atmosphere with the combustion products of sulfur, namely sulfur dioxide. Accordingly, there is a substantial desire in the art for the production of a novel system by which the sulfur dioxide impurities can be removed from stack gases and other $SO_2$-containing gases, such as the gases produced from the burning or combustion of high sulfur-containing fuels in power plants, as well as from paper mill and smelter gases, and from hydrogen sulfide-based sulfur plants, sulfuric acid plants, and the like.

In addition to such air pollution considerations, great interest also exists with reference to recovering, for subsequent use, sulfur dioxide from the combustion gases obtained when sulfur or high fuels are burned. The sulfur dioxide thus recovered would be utilized as by, for example, further oxidation to sulfur trioxide for the production of sulfuric acid. It is likewise possible, particularly when the sulfur dioxide is recovered from the stack gases produced from the combustion of high sulfur fuels, to react the recovered sulfur dioxide with hydrogen sulfide to produce sulfur. Accordingly, in addition to the desire to keep the air free from pollution and free from unwanted sulfur dioxide contamination, the commercial utilization of the recovered sulfur dioxide to produce other valuable products is of considerable importance.

The ever increasing awareness and concern relating to the environmental aspects of atmospheric emissions, and the desire to recover and utilize valuable by-product materials, relate not only to sulfur dioxide, but to all sulfur-containing industrial waste streams being discharged to the atmosphere. As a result, numerous processing techniques have been proposed for the removal of sulfur dioxide, hydrogen sulfide and other sulfur-containing gases from a variety of industrial gas streams. While all such proposals are of interest and many may offer promise in reducing atmospheric pollution, the recognition of the environmental consequences of all aspects of industrial waste disposal suggest and even compel that further advances be made with respect to industrial gas discharge operations. Thus, regulations controlling the discharge of sulfur contaminants to the atmosphere have been made more restrictive, with further tightening of such regulations awaiting only the development of more effective pollution control techniques rendering such more restrictive standards commercially feasible for incorporation in industrial process operations.

With respect to the removal of hydrogen sulfide from natural gas, refinery waste gases and other industrial gas streams, the use of N-alkylated lactams have been proposed. Thus, Thormann et al., U. S. Pat. No. 3,120,993, disclose the absorption of hydrogen sulfide and organic sulfur compounds from a gas stream by counter-current contact with a stream of N-alkylated lactam absorbent as disclosed in Column 4, line 33 et seq. The Kohrt U.S. Pat. No. 3,324,627, also discloses the use of methyl pyrrolidone as a solvent for hydrogen sulfide.

In the Fuchs U. S. Pat., No. 3,103,411, such hydrogen sulfide removal from gas streams by means of N-alkyl pyrrolidone and like materials is further disclosed, with the hydrogen sulfide thus removed by an oxidation with oxygen, $SO_2$ or gases containing the same to produce elementary sulfur. For this purpose, the gas stream to be treated is contacted with liquid N-alkyl pyrrolidone at temperatures of $-20°$ to $+150°C$ so as to dissolve hydrogen sulfide in the liquid pyrrolidone. Since $SO_2$ rather than molecular oxygen can be employed for reaction with the dissolved $H_2S$ to produce the desired elemental sulfur in the N-alkyl pyrrolidone, Fuchs teaches that $H_2S$-containing gases that also contain sulfur dioxide, such as Claus contact furnace waste gas, are especially useful. Fuchs discloses various examples in which $SO_2$ is passed into N-alkyl pyrrolidone containing the $H_2S$ stripped from a waste gas stream, the $SO_2$ and $H_2S$ reacting to produce the elemental sulfur product. In Example 11, Fuchs indicates that $SO_2$ can be dissolved in a separate body of N-methyl pyrrolidone, as from a roaster gas containing 8.1% $SO_2$ by volume, with this body of lactam being united with a separate body of lactam containing the $H_2S$ dissolved therein, the $H_2S$ being oxidized to sulfur upon mixing of the two bodies of lactam material.

Fuchs discloses that the $H_2S$ content of the natural gas stream treated in this example is reduced from 12.6 percent by volume to less than 0.05 percent by volume, i.e. 500 ppm. In other examples, Fuchs indicates that the waste gas upon treatment was "free" of $H_2S$.

Techniques have also been proposed for general applicability to the removal of acid gases from gas streams by means of a variety of solvent combinations and particular operating procedures. Thus, British Pat. No. 1,196,610 discloses the purification of gas streams containing $CO_2$ and other gases, $H_2S$, $SO_2$, etc., employing, as disclosed on page 2, line 34 et seq., secondary monohydric alkanolamine solvent and a second organic solvent, other than an alkanolamine, having a specified solubility for $CO_2$, a boiling point of at least 150°C and a specified non-hydroxyl functional group. Preferred second solvents specified include cyclic and acyclic ethers, glycol ethers, dioxolanes, dioxanes, furans, trioxanes, oxazoles, etc., sulfones and sulfoxides, substituted and unsubstituted pyrroles such as 2-pyrrolidone and N-methyl pyrrolidone, with Sulfolane and dioxolane, e.g., 2,2-dimethyl-4-hydroxymethyl-1,3-dioxolane being particularly preferred. Table II shows that the combination solvent, in its particularly preferred embodiments, permitted a given $CO_2$ absorption to be accomplished in a smaller gas-liquid contact time than in the comparison solvent combinations employed.

In British Pat. No. 1,234,862, in the name of Claude Dezael, an apparatus is disclosed for separating gas mixtures by liquid solvents in which at least two extraction zones and at least two decanting zones are provided for greater efficiency and higher flow rate operation. Dezael discloses absorbing a wide variety of gases from gaseous mixtures by passage through the disclosed apparatus, such gases including $CO_2$, $H_2S$, $SO_2$, $SO_3$, $Cl_2$, HCl, $NO_2$, $NH_3$ and $C_2H_2$. Solvents such as alkanolamines, amino acids, water, aqueous solutions of amines, ammonia or mineral salts, dimethylsulphoxide, N-methyl pyrrolidone, glycol, polyglycols, ethers, esters, Sulfolane and other solvents of industrial use are disclosed as being suitable at page 2, line 116 – page 3, line 15. As in the Fuchs patent referred to above, the reaction of absorbed $H_2S$ and $SO_2$ to produce sulfur is disclosed. In Example 1, ethanolamine dissolved in dimethylsulphoxide is used to remove $CO_2$ from hydrogen. The discharged hydrogen gas stream was said to contain no more than a trace of $CO_2$, the trace being indicated as less than 0.1 percent by volume, i.e. 1,000 ppm. In Example 2, a solvent combination of 50 parts by volume of ethanolamine and 50 parts by volume of N-methyl pyrrolidone was used to extract $CO_2$ from nitrogen, the effluent gases being said to consist essentially of nitrogen.

Numerous other references attest to the commendable effort being made in many areas of industrial activity to develop air pollution controls and by-product recovery techniques relating to various sulfur contaminants of industrial gas streams. The stripping of sulfur dioxide from gas streams, such as from combustion gas streams, however, remains a major problem of genuine environmental concern. This concern and the desire for more restrictive air pollution control regulations are expressed in Chemical Engineering, June 14, 1971, pages 58, 60 and 62 in an article entitled "Sulfur-recovery Processes Compete for Leading Role." As indicated therein, regulations adopted or under consideration in major United States cities for sulfur dioxide stack specifications range from 100 ppm to 500 ppm of $SO_2$. It is also indicated that commercial feasibility has not been proved for any of the variety of proposals being considered, although the 1970 Clear Air Act mandates that "the best available technology" be utilized by 1975 and that the standards adopted be met, rather than waiting for "ideal" processes to become available. It is also stated in this article that the ability to regenerate the reagent employed, whatever it may be, for recycle and reuse appears to be a necessary requirement for a successful pollution control process.

Chemical Week, of Dec. 8, 1971, pages 33–34, provides a further indication of the industrial significance of proposals for more restrictive emission standards. This article also points out that 2,000 ppm has been the standard adopted by most states up until the present time, the more restrictive standards under consideration being considerably lower than the present ones and necessitating a highly effective technique for reducing emissions without an unduly adverse effect on the economic feasibility of the processes into which it is incorporated.

There is, therefore, a highly critical and urgent need for new techniques for controlling sulfur dioxide emissions to the atmosphere in industrial operations. New techniques for this important purpose must, however, accomplish the highly desirable control of such emissions in an economically acceptable manner, particularly providing for the ready regeneration and recycle of the materials employed so as not to obviate the economic justification for continuing the basic operation in a non-polluting manner in accordance with the more restrictive emission control requirements presently contemplated and desired. A further highly desirable feature of such a pollution control technique would be the ability to utilize the sulfur values recovered from stack gases for use in practical, non-polluting applications so as to further minimize the economic consequences resulting from a successful effort to reduce sulfur dioxide emissions to the levels presently contemplated for environmental protection of the atmosphere.

It is an object of the present invention, therefore, to provide an improved process for the selective removal of sulfur dioxide from mixtures of gases containing the same.

It is another object of the invention to provide an improved process for said selective removal of sulfur dioxide from a wet or dry gaseous stream.

It is another object of the invention to provide a process for the effective stripping of sulfur dioxide from gas streams sufficiently to permit the non-polluting discharge of said gas streams to the atmosphere.

It is another object of the invention to provide a process for the stripping of sulfur dioxide from gas streams to be discharged to the atmosphere to less than about 250 ppm, advantageously to less than about 100 ppm.

It is a further object of the invention to provide a process for the stripping of sulfur dioxide from gas streams by means of a liquid solvent capable of being regenerated and recycled for further use.

It is a further object of the invention to provide a process for the stripping of sulfur dioxide from gas streams and for the recovery of said sulfur dioxide in a form suitable for subsequent non-polluting disposal or use.

These and other objects are achieved by the invention as hereinafter set forth in detail, the novel features thereof being particularly pointed out in the appended claims.

SUMMARY OF THE INVENTION

N-alkyl lactam, particularly N-lower alkyl pyrrolidone, such as N-methyl pyrrolidone, is employed to strip sulfur dioxide from a gas stream sufficiently to permit the non-polluting discharge of the gas stream to the atmosphere. The remarkable effectiveness of N-alkyl lactam for this purpose permits gas streams flowing at commercially feasible flow rates to be treated in a contacting zone of economically practical size to strip $SO_2$ therefrom, at 0°–75°C, preferably about 35°C to about 65°C, to permit a gas stream having from about 0.5 percent to about 10% $SO_2$ by volume to be discharged to the atmosphere with an $SO_2$ content of less than about 250 ppm, advantageously less than 100 ppm. Gases having a wider range of sulfur content, e.g. 0.01 percent to about 50 percent by volume, can thus be treated by N-alkyl lactam under such commercially feasible conditions to achieve at least about 90 percent by volume, desirably at least about 95 percent or even 98 percent or above, stripping of the $SO_2$ content of the gas stream being treated.

The N-alkyl lactam having $SO_2$ absorbed therein can readily be regenerated by heating to 100°–200°C to strip the SO₂ therefrom without loss or degradation of the N-alkyl lactam. The regenerated lactam solvent can be recycled to the contacting zone for contact with additional quantities of gas containing sulfur impurities. The lactam employed can tolerate the presence of water without loss of effectiveness. An aqueous solution having water content of up to about 25 percent by weight or more can thus be maintained in the contacting or absorption zone. The sulfur dioxide stripped from the lactam is readily recovered for non-polluting disposal or use.

BRIEF DESCRIPTION OF THE DRAWING

The present invention is hereinafter set forth in further detail with reference to the accompanying drawing that constitutes a flow diagram representing an embodiment of the invention.

DETAILED DESCRIPTION OF THE INVENTION

In the practice of the present invention, a gas stream containing sulfur dioxide impurities is passed through an absorption zone for contact with a liquid alkyl lactam solvent. The lactam employed is highly selective for sulfur dioxide and has a high sulfur dioxide absorbing ability over a specified temperature range. These desirable solubility characteristics of the lactam are accompanied by additional features of great significance, permitting the lactam solvent to be regenerated for recycling to the absorption zone for contact with additional quantities of sulfur dioxide containing gas. Thus, the high solubility of the lactam for sulfur dioxide decreases sharply at higher temperatures as hereinafter indicated. The lactam is capable of withstanding such higher temperatures without degradation, and the low vapor pressure of the lactam allows ease of design for prevention of undesired loss of lactam during the regeneration operation.

Gas streams having a wide range of sulfur dioxide impurity contents can be treated, in accordance with the present invention, under commercially significant conditions, to strip the sulfur dioxide impurities from sand streams. Thus, gas streams containing from about 0.1 percent to about 50 percent sulfur dioxide by volume can be contacted with a liquid N-alkyl lactam solvent under the conditions hereinafter set forth to remove at least about 90 percent by volume of the sulfur dioxide impurities present in the untreated gas stream. The gas stream discharged from the contacting or absorption zone with the sulfur dioxide impurities very substantially washed therefrom can subsequently be utilized or further treated in an appropriate manner. Where the sulfur dioxide impurity content of the treated gas stream is less than the applicable air pollution control regulations, the non-polluting discharge of the treated gas stream to the atmosphere would be permissible. The treated gas stream referred to above, it will be noted, include gas streams having s sulfur dioxide content of less than those of the existing and many of the contemplated pollution control regulations relating to sulfur dioxide emission to the atmosphere as well as those containing very large amounts of sulfur dioxide. In all such instances, a very substantial amount of the sulfur dioxide impurity content of the gas streams to be treated can be removed therefrom by the process of the present invention, the sulfur dioxide impurities thus removed being recoverable for nonpolluting disposal or use. The present invention is of particular value with respect to the stack gas streams from many industrial operations, such as the burning of sulfur-bearing fuels, in which the gas stream contains from about 0.05 percent to about 10% SO₂ by volume. Such gas stream, under the contemplated and desirable pollution control regulations under consideration, could not simply be vented as a non-polluting discharge to the atmosphere. By means of the present invention, however, the sulfur dioxide impurity content of such stream can be reduced to not more than about 250 ppm, i.e., parts per million parts of gas by volume. Where even more restrictive pollution control regulations are deemed necessary or advisable, the process of the present invention can be employed to reduce the sulfur dioxide impurity content of such gas stream to less than about 100 ppm. In particular embodiments of the invention, the sulfur dioxide impurity concentration in the gas stream discharged from the absorption zone upon contact with the specified N-alkyl lactam will be from about 50 ppm to about 100 ppm. In response to the genuine concern for the environmental aspects of various industrial operations and the discharge of gas streams therefrom to the atmosphere, the present invention further permits the discharge of gas streams having sulfur impurity concentrations of as low as from about 5 ppm to about 50 ppm, rendering the present invention adaptable to any likely standard that might reasonably be adapted with respect to sulfur dioxide emissions for non-polluting discharge of gas streams to the atmosphere. As used herein, the term "non-polluting discharge" of gas streams to the atmosphere refers to the discharge of gas streams to the atmosphere with sulfur dioxide impurity contents of less than those of applicable national, state or local pollution control regulations, but nevertheless generally less than about 250 ppm and in any event not exceeding about 300 ppm.

In accordance with the process of the present invention, the selective solvent employed, i.e., N-alkyl lactam, is preferably an N-alkyl pyrrolidone or piperidone, generally having from about one to about 16 carbon atoms in the alkyl group, which includes N-cycloalkyl groups. Most preferred are the N-lower alkyl groups of 1 to 6 carbon atoms, including N-lower cycloalkyl groups, such as the N-cyclohexyl group. The most preferred selective N-lower alkyl pyrrolidone for use in the practice of the present invention comprises N-methyl pyrrolidone. Illustrative of other liquid N-lower alkyl lactams suitable for use as solvents in the practice of the present invention include, but are not necessarily limited to the following: N-ethyl pyrrolidone, N-propyl pyrrolidone, N-isopropyl pyrrolidone, N-t-butyl pyrrolidone, N-n-butyl pyrrolidone, N-n-hexyl pyrrolidone, N-cyclohexyl pyrrolidone, N-n-octyl pyrrolidone, N-isooctyl pyrrolidone, N-n-decyl pyrrolidone, N-undecyl pyrrolidone, N-dodecyl pyrrolidone, N-tetradecyl pyrrolidone, N-hexadecyl pyrrolidone, N-methyl piperidone, N-ethyl piperidone, N-propyl piperidone, N-isopropyl piperidone, N-t-butyl piperidone, N-n-butyl piperidone, N-n-hexyl piperidone, N-n-octyl piperidone, N-isooctyl piperidone, N-n-decyl piperidone, N-undecyl piperidone, N-dodecyl piperidone, N-tetradecyl piperidone, N-hexadecyl piperidone, etc.

It should be noted again, however, that the preferred selective solvents for use in accordance with the process of the present invention comprise N-lower alkyl pyrrolidone and N-methyl pyrrolidone in particular.

The N-alkyl pyrrolidones and piperidones employed in accordance with the process of the present invention are lactams of the gamma- and delta- amino acid derived from butyric acid, valeric acid and caprylic acid. Since such substances are cyclic acid amides, they are neutral and therefore act in accordance with the present invention as physically dissolving absorbents, such materials having an affinity for the selective removal of sulfur dioxide. Thus, in accordance with the present invention it has been discovered that such N-alkyl lactams can effectively act as a selective solvent for sulfur dioxide from a mixture of wet and dry gases containing the same, such mixture of gases being a result, for example, of the burning or combustion of high sulfur fuels or from the production of sulfur itself. In this regard, one of the advantages of the use of N-alkyl lactams in accordance with the present invention, particularly, N-methyl pyrrolidone, resides in the fact that such solvents are water-soluble. This, therefore, allows sufficient operation in wet gases and minimizes loss of the solvent material. Moreover, as will be described hereinafter, it allows for the toleration of certain amounts of water in the system without decreasing the effectiveness of the solvent action.

Thus, for example, a stack gas resulting from the combustion of high sulfur containing fuels may contain in addition to the sulfur dioxide resulting from the combustion of the sulfur in the fuel, carbon dioxide, air, nitrogen, water vapor and other miscellaneous gaseous components. It is such typical gaseous mixture containing sulfur dioxide that can be effectively treated in accordance with the present invention by the use of the N-alkyl lactam as a selective solvent for the sulfur dioxide constituent. Accordingly, the process of the present invention is of particular importance with respect to a wide variety of industrial systems that require the burning of high sulfur fuels for operation or involve the incineration of sulfur compound waste gases. Thus, for example, the process of the present invention, as will be described hereinafter, can be effectively employed to eliminate the air pollution associated with the utilization of high sulfur containing feed stock or the burning of high sulfur containing fuels utilized for example, in an electric power generating station or other industrial systems where $SO_2$ is generated and dissipated in stack gases. The expression "to eliminate the air pollution" associated with the generation and dissipation of $SO_2$ in stack gases refers, as will be understood from the disclosure above, to the reduction of sulfur dioxide content of stack gases or other industrial waste gases to less than the permissible sulfur dioxide impurity content for "non-polluting discharge" to the atmosphere under applicable regulatory specifications as set forth above.

The process of the present invention is generally carried out for convenience in assuring proper contact of the gas stream having sulfur dioxide impurities to be removed therefrom with the N-alkyl lactam solvent by contacting an ascending stream of stack gases, or other gases to be treated, containing sulfur dioxide impurities with a descending stream of the liquid N-alkyl lactam. The N-alkyl lactam, preferably N-methyl pyrrolidone, may be either water-free or an aqueous solution of the N-alkyl lactam containing up to about 25 percent or more water by weight of said solution. Any conventional type of absorption tower suitable for such countercurrent contact of gas and liquid can be employed for this purpose. Thus, for example, it is possible, in accordance with the present invention, to contact the rising stream of gas with the descending stream of N-alkyl lactam, e.g., N-alkyl pyrrolidone, in a conventional bubble-tray tower, baffle tower, packed tower or any other suitable tower construction that permits the countercurrent flow and contact of the gas and liquid streams involved in the practice of the present invention.

The remarkable ability of the subject N-alkyl lactams to strip sulfur dioxide from gas streams, not heretofore appreciated in the art, permits $SO_2$-containing gas streams flowing at commercially significant flow rates to be treated in an absorption zone of practical, commercial size for incorporation in conventional industrial processing operations. Thus, the absorption or contacting zone of the present invention, for contact of the N-alkyl lactam solvent with sulfur dioxide impurity-containing gas streams flowing at gas mass flow velocities generally in the range of from about 200 to about 3,000 lbs/hr/ft$^2$, will generally range in length from about 5 ft to about 85 ft. It will be appreciated by those skilled in the art that the particular nature and construction characteristics of the absorption zone employed in any particular embodiment of the invention will, together with other pertinent operating factors, influence the size of the absorption zone employed in that particular embodiment. Thus, the length of the absorption zone will depend upon, for example, whether the absorption zone comprises a conventional bubble-tray tower or a packed tower or some other tower configuration, as well as upon such factors as the gas flow rate employed, the water content of the N-alkyl lactam solvent and of the gas stream being treated, the resulting viscosity of the lactam solvent, surface tension effects, tray spacing, operating temperatures, solvent recycle rates and the like. It will be appreciated, of course, that it is highly desirable that the absorption zone be as small as possible while accommodating the volume of gas to be treated and stripping the sulfur dioxide impurities therefrom sufficiently to permit the non-polluting disposal or other use of the treated gas stream, so as to minimize capital cost and maintenance and operating expenses.

As indicated above, the $SO_2$ stripping operation of the present invention is carried out at gas mass flow velocities ranging from about 200 to about 3,000 lbs/hr/ft$^2$, with rates of from about 500–1,000 to about 2,000 lbs/hr/ft$^2$ being commonly employed in preferred embodiments of the invention. In the practice of the invention, the gas flow, i.e., lbs/hr, to the absorption zone and the cross-sectional area of the absorption zone are determined to provide gas mass flow rates generally within the limits indicated. Such mass flow rates permit the desired $SO_2$ stripping to be accomplished in an absorption zone having the necessary and desirable equilibrium stages within the commercially feasible overall height limitations disclosed herein. As the gas mass flow rates are decreased below the lower end of the indicated range, the cross-sectional area of the absorption zone may be too large, relative to the characteristics of the overall processing operation, to avoid channeling of the gas through the absorption zone such that the gas has an inadequate opportunity for contact with the lactam solvent within the limits of a feasible height of the absorption zone. On the other hand, an absorption zone will not be employed with such a small relative cross-sectional area as to require an excessive column height, resulting in an undesired and excessive pressure drop requirement and expense to maintain gas flow and in an excessive entrainment of lactam in the treated gas discharged from the absorption zone.

In general, it has been found that an absorption zone having the equivalent of from about three to about eight theoretical plates or equilibrium stages is suitable and adequate for many sulfur dioxide stripping operations in accordance with the present invention. At tray efficiencies of 30–50 percent and at tray spacings generally of about 2 ft, bubble-tray absorption towers having a length of from about 10 to 40 ft can be employed although somewhat larger bubble-tray tower, up to about 85 ft, may be employed to permit flexibility in achieving optimum operating conditions and high stripping efficiency. As previously indicated, it will be understood that the desire to obviate any adverse environmental aspects of industrial gas disposal is necessarily accompanied by an equal desire to minimize the economic consequences thereof, so that the absorption zone in any particular application will desirably tend toward the smallest absorption zone needed to achieve the desired sulfur dioxide stripping in any given application. When a packed column-type absorption zone is employed, e.g., employing 1-inch ring-type packing or some equivalent packing, it has generally been determined that about 1 to about 3 ft of packed column is required for each theoretical plate or equilibrium stage required for gas-liquid contact. As a result, a packed column of this type, having a length of about 5 to 25 ft, will generally be suitable and adequate although sizes outside this range can also be employed. The length of the absorption zone employed, therefore, in any particular application of the invention will depend upon a variety of construction and operating conditions pertinent to achieve the degree of sulfur dioxide strippings necessary or desirable in any given application, but in all instances will be within the range of practical commercial feasibility.

By effecting, advantageously, such counter-current flow of the gas stream containing sulfur dioxide impurities and the N-alkyl lactam of the present invention, e.g., N-alkyl lactam water solution, particularly N-methyl pyrrolidone, it is thus possible to selectively remove the sulfur dioxide from said gas stream since the descending liquid stream of N-alkyl lactam or water-solution thereof absorbs essentially all of the sulfur dioxide in the initial gaseous stream. As a result, the treated gas leaves the absorption tower essentially free of sulfur dioxide, while a liquid stream of N-alkyl lactam rich in dissolved sulfur dioxide leaves the bottom of the absorption tower or other suitable counter-current gas-liquid contact apparatus. As is hereinafter discussed, the treated gas stream having sulfur dioxide stripped therefrom is, preferably, passed through a water wash section to extract all of the N-alkyl lactam, e.g., N-methyl pyrrolidone, from the scrubbed gas stream prior to the discharge thereof to the atmosphere or to any other disposal or use of said treated gas stream.

The liquid stream of N-alkyl lactam, particularly N-methyl pyrrolidone, containing dissolved $SO_2$ and water can subsequently be stripped of $SO_2$ and some or all of the water content thereof, in a distillation zone, so as to recover the N-alkyl lactam solvent for recycling and reuse and further sulfur dioxide absorption operations. The recovered $SO_2$ gaseous products of said distillation zone, as indicated previously, can be subsequently used, e.g., as in the production of sulfur trioxide, the main component employed in the production of sulfuric acid, or, e.g., to produce sulfur by the reaction of said $SO_2$ with hydrogen sulfide. The stripping of the dissolved $SO_2$ from the liquid selective solvent is easily effected in a stripping or distillation column or still operated at a higher temperature and/or lower pressure than that employed for the absorption of the $SO_2$ in the solvent. By operating the stripping column or still at such an elevated temperature, e.g., about 100°C to about 200°C, the sulfur dioxide gas is easily removed from the lactam and recovered, while the liquid lactam solvent can be withdrawn from said stripping column or still for subsequent utilization for the absorption of sulfur dioxide from additional quantities of stack or similar gas mixtures having sulfur dioxide impurities therein.

It should be noted that the absorption zone or tower operated to absorb sulfur dioxide in the descending selective N-alkyl lactam solvent can advantageously be operated at ambient temperatures or temperatures slightly above ambient temperatures. In this regard, it should be noted that the selective N-alkyl lactam solvent, and aqueous solutions thereof containing up to about 25 percent water by weight of said solution or more, have high absorption capabilities for the selective absorption of sulfur dioxide such that the absorption tower generally can be operated at as low a temperature as can economically be obtained. Thus, the absorption tower in accordance with the present invention can be operated at gas temperatures approaching as low as about 0°C and as high as about 75°C. It will be understood that higher gas temperatures in the absorption zone can be tolerated, but the absorption capabilities of the N-alkyl lactam solvent will begin to sharply decrease as higher temperatures are employed, as witnessed by the desirable stripping of the dissolved $SO_2$ from the lactam in a regeneration distillation zone or still as indicated above. As the gas stream to be treated will ordinarily be at an elevated temperature, it is generally unnecessary and undesirable to cool the gas stream to temperatures approaching 0°C prior to passage through the absorption zone. Accordingly, a preferred gas temperature range in the absorption zone is from about 35°C to about 65°C. Gas temperatures of about 35°C or slightly lower up to about 50°C can be reached by pre-cooling the gas stream with conventional water and air cooling techniques without the necessity for incurring the economic burden of incorporating a refrigeration system to chill the gas, as is ordinarily required when gas temperatures below about 35°C are employed. Water cooling can thus be conveniently employed to cool the gas stream to from about 35°C or somewhat lower, e.g., 32°C, while air cooling techniques can generally be employed to cool the incoming gas stream to about 50°C. It will be appreciated that somewhat higher gas temperatures, e.g., on the order of about 55°C to about 65°C, can also be advantageously employed within the preferred gas temperature range indicated above. As will be discussed in greater detail hereinafter, a gas stream to be treated that is available at an elevated temperature can be utilized, in heat exchange relationship, to supply all or a portion of the heat requirements of the distillation zone for regenerating N-alkyl lactam solvent by the stripping of the $SO_2$ content therefrom. It should be also noted that the pressure employed in the absorption zone is not a critical feature of the invention, it being generally preferred that the absorption tower be operated at atmospheric or slightly above atmospheric pressure, e.g., about 2 or 3 lbs of positive pressure, to assure an adequate flow of the gas being treated through the absorption zone and ultimately to the stack for discharge to the atmosphere. It will be understood, however, that there may be instances where compression of low pressure $SO_2$-bearing gases will be desirable. The absorption efficiency of the lactam solvent is increased in such instances in that the amount of solvent required is thus reduced. Such operation would be particularly advantageous, of course, where the treated gas stream is desired at an elevated pressure.

It has been discovered that the use of the N-alkyl lactam solvent, i.e., N-methyl pyrrolidone, in anhydrous form is best or most advantageous for the desired stripping of sulfur dioxide from the mixture of gases containing sulfur dioxide impurities as provided in the practice of the present invention. It should be noted, however, that the N-alkyl lactam solvent can tolerate appreciable quantities of water while nevertheless having excellent solvent powers for sulfur dioxide gas. As a result, it is sometimes desirable to have a proportion of water present in the selective N-alkyl lactam solvent, in that the presence of minor amounts of water tends to aid in the stripping of the dissolved sulfur dioxide from the selective solvent during regeneration in a distillation zone or still. In this regard, it should also be noted that some water will generally be present in the solvent in the absorption zone in any event, since water will ordinarily be absorbed from the gases being treated in the absorption zone or column. Completely anhydrous conditions are extremely difficult to maintain, therefore, in many practical applications of the invention for the treatment of industrial gas streams. Based upon the considerations relating to the power and selectivity of the solvent, and the necessity for providing an ease of stripping during solvent regeneration in accordance with the present invention, it has been discovered that the selective N-alkyl lactam solvent may advantageously contain up to about 25 percent water by weight or more and, in fact that such a water content may be preferred for most efficient operation of the instant process in various applications thereof.

In order to recycle essentially anhydrous lactam solvent from the regeneration zone to the absorption zone, it is necessary to distill the solvent in the regeneration zone at about 200°C to assure the desired stripping of the $SO_2$ dissolved therein. By operation of the regeneration still so as to recycle a lactam-water stream to the absorption zone, the heat requirements in the regeneration zone can be appreciably reduced. As the effectiveness of the $SO_2$ stripping power of the N-alkyl lactam is not appreciably diminished, as indicated above, water contents of up to about 25 percent or even 30 percent, by weight or more can be tolerated in the lactam stream recycled to the absorption zone. As the water content of the recycled lactam stream increases, the heat requirements in the regeneration zone are lowered significantly, providing a corresponding advantage in the overall economics of the process of the present invention. Thus, at about 20 percent water by weight in the recycled lactam stream, the boiling point of the lactam-water mixture regenerated in the distillation zone is only about 107°C.

In some embodiments of the invention, therefore, it has been found desirable to operate the regeneration zone so as to recycle a lactam-rich stream therefrom to the absorption zone with an appreciable water content. In such embodiments, a water content of about 20 percent to about 25 percent by weight in the lactam stream thus withdrawn from the regeneration zone has been found particularly advantageous. While the effectiveness of the lactam solvent at this water level is somewhat less effective then such solvents at a lower water level, the heat requirements for operation of the regeneration zone are appreciably reduced, as indicated above, and the regeneration zone can be operated with little or no lactam carry-over with the $SO_2$-water vapor stream therefrom, thus simplifying the regeneration-reflux operation and minimizing any loss of lactam in said regeneration operation. For most efficient $SO_2$ stripping from the gas stream being treated, however, it is generally preferred to operate the regeneration zone so as to recycle a lactam stream having a lower water content, providing the absorption zone with a lactam having a water content of from about 2 percent to about 10 percent by weight, with from about 5 percent to about 10 percent, being particularly preferred in many applications of this embodiment of the invention. This embodiment, it will be appreciated, is of particular value where a very high degree of stripping is desired and where the heat requirements of the regeneration zone can be met without imposing any undue economic burden on the overall system. In practical, commercial applications of the invention, the external heat requirements can be minimized or eliminated as indicated below. The water content of the lactam stream recycled to the absorption zone, therefore, can be varied in the practice of the present invention to provide a desirable balance between the $SO_2$ stripping characteristics of the solvent in the absorption zone and the heat requirements of the regeneration zone as effected by the practical considerations that pertain to the particular overall conditions of a given application of the invention. As indicated above, the water content of the recycled lactam stream and thus of the lactam present in the absorption zone will be within the limits as hereinabove indicated.

It will be appreciated that, in general, it would be advantageous and highly desirable to carry out the process of the present invention without the necessity for supplying heat from any external source for the operation of the regeneration zone. As indicated above, the ability to tolerate a small amount of water in the absorption zone provides a desirable reduction in the overall heat requirements of the regeneration zone. As a means for minimizing or even eliminating the need for such external heat, the present invention can advantageously be carried out so as to utilize the heat content of the incoming gas stream to be treated as the source of heat for operation of the regeneration zone. In many applications of the present invention, the incoming gas to be treated will have such available heat naturally occurring therein, as in hot combustion gases, that must be cooled, in any event, prior to passage through the absorption zone at temperatures within the range previously set forth. Operating expenses can be reduced in a desirable manner, therefore, by utilizing the excess heat of the gas to be treated, through an appropriate heat exchange medium, to provide the distillation heat requirements of the regeneration zone.

It will also be appreciated that any additional excess heat in the incoming gas stream, beyond that required for operation of the regeneration zone, may also be recovered by any suitable heat exchange operation, as to pre-heat the lactam stream passing to the regeneration zone and to heat the treated gas stream of reduced $SO_2$ content to facilitate its passage through the discharge stack. In other applications of the invention, it may be desirable or necessary for some purpose to utilize the heat requirements of the incoming gas stream in some other manner. In any circumstance where an excessive amount of heat is otherwise available, it will be understood that the present invention does not require the utilization of the heat available in the incoming gas stream to be treated apart from such utilization as will enhance the economic aspects of the practice of the present invention. Such embodiments of the invention in which the heat requirements thereof are minimized, however, will generally be of particular significance since, as previously discussed, the present invention relates to an environmental necessity in existing operations with minimum cost desired so as not to adversely effect or jeopardize the economic justification for continuing the basic operation itself. The flexibility existing in the practice of this invention to achieve optimum operating conditions, together with the ability to regenerate the lactam employed, together with the ability to minimize loss of lactam as hereinafter set forth, all enhance the great commercial significance of the present invention in air pollution control and environmental protection.

In the present invention, the sulfur dioxide that is removed from the selective N-alkyl lactam solvent in the stripping column of the regeneration zone is withdrawn from the top of such column, together with water vapor and any $CO_2$ that may be present, and may be introduced into a further wash column where the sulfur dioxide gas is washed with water. Such washing of the sulfur dioxide gas will allow further removal of any entrained solvent to that even further solvent can be recovered for reuse in accordance with the process of the present invention. The sulfur dioxide that is obtained from such a washing process can, of course, be compressed for recovery and reuse in any further desired manner. It should be noted that the sulfur dioxide obtained by stripping thereof from the gas stream being treated by the selective solvent process of the present invention is very useful as a reactant for subsequent production of sulfur or sulfuric acid, both products having high desirability in the art.

The treated gas stream passing from the absorption zone at the indicated flow rate, with $SO_2$ stripped therefrom, will be accompanied by relatively small amounts of N-alkyl lactam removed from the absorption zone by the gas stream flowing therethrough. The lactam thus removed from the absorption zone may be present in the treated gas stream in vaporized form or may be entrained as liquid droplets in the gas stream. While the proportion of lactam thus vaporized or entrained in the treated gas stream may be relatively small, it will be appreciated that the cumulative amount of lactam thus removed from the absorption zone, unless recovered, would represent an operating expense of considerable magnitude in the practice of the present invention in continuous $SO_2$ stripping from gas streams in large-scale industrial operations. Such lactam removal in the treated gas stream is increased, at relatively high gas flow rates, high pressure drop across the absorption zone and at relatively high temperature conditions in the absorption zone. At 60°C, a gas stream passing at a rate of about 1,000 lbs/hr/ft$^2$ through an absorption zone containing the preferred N-methyl pyrrolidone liquid solvent would be discharged therefrom with a lactam content of about 17.5 lbs/hr/ft$^2$. At lower gas temperatures in the absorption zone, the amount of lactam vaporized or entrained in the discharged gas stream would be reduced, but would nevertheless represent a highly significant loss of lactam. At 35°C, the gas stream discharged from the absorption zone at about 1,000 lbs/hr/ft$^2$ would be accompanied by about 4.3 lbs/hr/ft$^2$ of said N-methyl pyrrolidone. For an absorption zone having a cross-sectional diameter of about 9 ft, i.e., a cross-sectional area of nearly 64 ft$^2$, a loss of N-methyl pyrrolidone totaling about 6,400 lbs per day would be encountered. This loss, at existing market rates, would thus amount to an operating loss of $3,000.00 per day, which on a cumulative basis, would constitute an operating loss on the order of approximately 1 million dollars a year. Such a loss, it will be appreciated, might well render the remarkable $SO_2$ stripping process of the present invention economically undesirable despite the highly advantageous sulfur dioxide stripping achieved thereby and the accompanying ability to regenerate the selective solvent employed in a convenient, economically suitable manner without undue loss or degradation of the selective solvent employed. In desirable embodiments of the overall process of the present invention, however, it is readily possible to recover the lactam vaporized or entrained in the gas stream discharged from the absorption zone so as to avoid an unacceptable loss of lactam in the treated gas stream discharged to the atmosphere or otherwise disposed of after $SO_2$ scrubbing in the absorption zone.

In the practice of the present invention, at least about 90 percent by weight, advantageously at least about 98 percent, preferably 99 percent or more, of the N-alkyl lactam vaporized or entrained in the treated gas stream discharged from the absorption zone may be recovered by passing the gas stream from the absorption zone directly through a water-containing scrubber zone prior to discharging the gas stream to the atmosphere or other contemplated disposal means. The treated gas stream will thus pass from the absorption zone to the scrubber zone, conveniently located at the top of the absorber column or column, at the indicated gas mass flow velocity of from about 200 to about 3,000, typically about 1,000 to 2,000, lbs/hr/ft$^2$, the gas temperature being from about 0°C to about 75°C, advantageously about 35°C to about 65°C. Because of the relatively small amount of lactam in the gas stream passing from the absorption zone and in light of the relatively high solubility of the lactam in water, a relatively small amount of water and a small scrubber zone can be employed to minimize the loss of lactam in the treated gas discharged to the atmosphere. Thus, the amount of water needed in the scrubber zone will generally range from only about 0.1 percent to about 5 percent by weight of the lactam employed in the absorption zone, most commonly about 0.5 percent to about 1 percent water by weight of lactam in the absorption zone being sufficient.

The scrubber zone may comprise any conventional construction permitting suitable gas-liquid contact, e.g., a bubble-tray tower, baffle tower, packed tower or any other suitable gas-liquid contacting tower or column. In a preferred arrangement in this embodiment of the invention, the treated gas stream from the absorption zone passes directly upward into the scrubber zone for counter-current flow and contact with a descending stream of water. While the size of the scrubber zone will necessarily depend upon various operating factors and conditions, such as the particular gas flow rate employed, the amount of lactam vaporized or entrained therein, the type of gas-liquid contact construction employed, and the like, the scrubber zone will, in general, be about one-fifth to about one-third the size of the column employed for the absorption zone. The scrubber zone will thus have a length of generally from about 2 ft to about 25 ft, typically from about 3 ft to about 15 ft, although sizes outside this range may be employed providing the gas-liquid contact provided therein is such as to permit the water in the scrubber zone to remove at least about 90 percent by weight and desirably essentially all of the lactam accompanying the treated gas stream passing therethrough at the indicated gas mass flow rates.

During continuous operation utilizing the water scrubber hereinabove disclosed, water may be fed to the scrubber at the rate that a water stream having lactam dissolved therein is withdrawn from the scrubber. The water may be fed to the scrubber zone at any convenient temperature, generally within the range of from about 0°C to about 75°C, e.g., about 35°C. The rate of water flow to and from the scrubber zone is relatively low, as hereinafter indicated, in keeping with the relatively low water requirement in general with respect to the desired, essentially complete recovery of lactam vaporized or entrained in the gas stream being treated. It is within the scope of the present invention to pass the lactam-containing water stream removed from the scrubber zone either directly into the absorption zone or, without so passing into the absorption zone, to the solvent regeneration zone for the recovery of the lactam content thereof together with the lactam removed from the absorption zone for regeneration therein. While, in a relatively small gas-treating plant, the water stream from the scrubber zone may advantageously be fed directly into the absorption zone, it is generally preferred that the water removed from the scrubber zone be passed instead to the regeneration zone. It will be understood that the lactam-containing water stream removed from the scrubber zone may be heated by passage through suitable heat exchangers, as for example to utilize a portion of the excess heat available in the incoming gas to be treated or in the lactam-rich stream recycled from the regeneration zone to the absorption zone. It should also be noted that the water requirements of the scrubber zone are entirely compatible with the overall ability of the system to tolerate the presence of water with the N-alkyl lactam in the absorption zone as previously discussed. Thus, the process of the present invention can be advantageously operated within the desired water content limits without any adverse effect resulting from the incorporation of the lactam-containing water stream from the scrubber zone with the $SO_2$-containing lactam stream removed from the absorption zone for concurrent treatment in the regeneration zone. As previously indicated, the presence of water within the indicated limits does not unduly effect the remarkable ability of the subject lactam to strip $SO_2$ from a gas stream but does favorably reduce the overall heat requirements pertaining to the operation of the regeneration zone. It should also be pointed out, with regard to this aspect of the present invention that, in place of water in the scrubber zone, it is possible to employ another liquid solvent for the vaporized and entrained lactam passing through said scrubber zone. Thus, it would be possible to employ N-cyclohexyl pyrrolidone, or a similar lower N-alkyl lactam, in the scrubber zone through which a gas stream having vaporized and entrained N-methyl pyrrolidone is passed at the indicated flow rates. The use of such other solvent in place of water, however, is not generally preferred as the liquid stream removed from the scrubber zone with the recovered lactam therein would then need to be passed to a separate regeneration still for the recovery of the desired lactam. In the preferred embodiment, the lactam-containing water stream, as herein indicated, can be conveniently passed directly to the regeneration zone in which the lactam removed from the absorption zone is regenerated.

The novel process of the present invention is hereinafter further described with reference to the accompanying drawing illustrating a schematic flow chart of a suitable system for carrying out the process of the present invention. As shown, a sulfur dioxide impurity-containing gas stream is introduced through line 10, blower 11, and line 12 into heat exchanger 13 wherein it is cooled by a suitable heat exchange medium in line 15 from the regeneration zone, and, if desired, into heat exchanger 13a for further indirect heat exchange with liquids, as in line 15a, constituting the liquid streams of line 27 passing to still 30. Other cooling means, of course, may be employed as necessary or desired to reduce the gas temperature to the desired levels heretofore indicated. The cooled gas is introduced through line 16 into the bottom portion of column 20, comprising a lower absorption zone or section 21 and an upper scrubber or wash zone or section 22. The gas having $SO_2$ impurities therein rises upwardly through absorber section 21 countercurrent to a descending stream of N-alkyl lactam solvent, i.e., N-alkyl pyrrolidone introduced into the upper portion of said absorber section 21 through line 23.

From the top of absorber section 21, the gas stream having $SO_2$ stripped therefrom passes into water wash or scrubber section 22, wherein it continues to pass upwardly countercurrent to a descending stream of wash water introduced into the top of said section 22 through line 24. The water wash stream in said section 22 serves to recover or remove all or most of any N-alkyl lactam that is entrained or vaporized in the scrubbed gases entering said scrubber section 22 directly from said absorber section 21. The treated gases are removed from the top of scrubber section 22 through line 25 and may be vented through suitable stacks for non-polluting discharge to the atmosphere without an unacceptable loss of lactam or may otherwise be disposed of or utilized. If desired, the treated gas stream may be passed in heat exchange relationship with the incoming gas stream in exchanger 13c to further cool said incoming stream and to facilitate discharge of the treated gas stream through the stack.

The wash water containing most of the N-alkyl lactam accompanying the gas stream passed from absorber zone 21 to scrubber zone 22 is removed from the bottom of section 22 through line 14. If desired, a portion of the water removed through line 14 may be recirculated through line 26 and line 24 into the top portion of scrubber section 22.

From the bottom of absorber section 21, a solution of $SO_2$ in aqueous N-alkyl lactam is removed through line 27 for passage, if desired, through heat exchanger 13a and/or heat exchanger 28 prior to being introduced into distillation column 30 wherein it is further heated by indirect heat exchange with a heating medium, in coil 38 at the bottom of said distillation column 30. Said heating medium, as previously indicated, can be preheated as by passage in line 15 through heat exchanger 13. As shown, the lactam-containing water stream removed from scrubber zone 22 through line 14 may be joined with the lactam stream passing from said absorption section 21 through line 27, if desired. In another embodiment of the invention, the water removed from scrubber zone 22 may be passed through line 14a to a cooling zone 13b to cool the incoming gas stream, with a fly ash sludge containing trace amounts of the N-alkyl lactam and $SO_2$ being removed from the system through line 15b. In this embodiment, incoming gas passes through blower 11 and line 12a into cooler 13b, and the cooled gas stream passes through line 16a into the bottom of column 20.

From the bottom of distillation column 30, a regenerated N-alkyl lactam-rich stream is removed through line 23, passing, for example, through said heat exchanger 28 for indirect heat exchange with the $SO_2$-containing lactam stream passing in line 27 from scrubber zone 21 to distillation zone 30. From said heat exchanger 28, the lactam-rich stream continues through line 23, through heat exchanger 35 for further cooling by indirect heat exchange with cooling water before being introduced into the top portion of absorber section 21 at an appropriate temperature to permit operation of the absorption zone at the indicated temperature levels.

The $SO_2$ and water vapor stripped or distilled off from the solution in distillation zone 30, together with any small amount of $CO_2$ that may be present, pass from the top of said distillation zone 30 through line 31. A portion of the water vapor is condensed in partial condenser 32 from which the resulting gas-liquid mixture is passed to reflux accumulator 33. Water is recirculated through reflux to said distillation column 30 through line 33a. $SO_2$ and water vapor from accumulator 33 pass through line 36 to compressor 37, wherein the gaseous mixture is compressed to about 100 psig to condense the water portion thereof and is thereinafter passed through line 39 to cooler 47 and to accumulator 48. From said accumulator 48, a recycled vapor stream containing any $CO_2$ present, together with a small amount of $SO_2$, is passed through line 49 for recycle into absorption zone 21 of column 20 together with additional quantities of sulfur dioxide-containing gas entering said absorption zone 21 through line 16. An aqueous solution of $SO_2$ is passed from accumulator 48 through line 50 into a second distillation zone, or sulfur dioxide still, 40. Live steam is introduced into the bottom of said still 40 to line 41 in order to distill off the $SO_2$ from the water. The water thus stripped of $SO_2$ is removed from the bottom of still 40 through line 42 and can, if desired, be recycled to water scrubber zone 22 through line 24.

$SO_2$ is removed from the top of still 40 through line 43 at a temperature of, for example, about 110°F and is condensed in condenser 44 operated at a pressure of about 75 psi(g) and a temperature from about 80° to 90°F. The condensate from condenser 44 is passed through line 46 to liquid $SO_2$ accumulator 51, from which a portion of the condensed $SO_2$ is recirculated through line 45 into the top of still 40 for reflux. If desired, a recycle vapor stream can be removed from accumulator 51 through line 53 for recycle, with vapor in line 49, to absorption zone 21. The remainder of the $SO_2$ can be removed from said accumulator 51 through line 52 as an essentially pure liquid $SO_2$ product, having an $SO_2$ content of generally from about 90 percent to about 95 percent by weight, containing very small amounts of impurities, mainly $CO_2$. This liquid $SO_2$ product represents a valuable by-product of the $SO_2$ stripping process, said liquid $SO_2$ product being in convenient form for non-polluting handling, transport, storage and use.

EXAMPLE 1

In the application of the sulfur dioxide stripping process as hereinabove set forth with respect to the flue gas from an electric power station having a generating capacity of 250,000 KW, burning a high sulfur bituminous coal, the flue gas having sulfur dioxide impurity therein is passed at a rate of $26.6 \times 10^6$ std. cu ft/hr, or $2 \times 10^6$ lbs/hr, and a temperature of about 350°F through line 10, blower 11 and line 12a into a cooler 13b where it is washed, or cooled and washed, by a spray of water introduced into the top of the cooler through line 14a. From the bottom of cooler 13b, a fly ash sludge, containing trace amounts of N-methyl pyrrolidone and $SO_2$, is removed from the system through line 15b. The cooled and washed flue gases from cooler 13b pass through line 16a to absorber zone 21 of column 20 at a temperature of about 110°F. The composition of the flue gases entering the cooler through line 12a, in percent by volume, is approximately: $SO_2$ 0.2%, $CO_2$ 11.6%, $O_2$ 6.6%, $N_2$ 79.0% and $H_2O$ 3.0%. The composition of the gases removed from the cooler through line 16, in percent by volume, is approximately as follows: $SO_2$ 0.19%, $CO_2$ 10.92%, $O_2$ 6.14%, $N_2$ 73.30%, and N-methyl pyrrolidone solvent 0.35 percent.

The cooled flue gases pass through the lower absorber section 21 of column 20 countercurrent to a descending stream of N-methyl pyrrolidone solvent introduced into the upper portion of said absorber section 21 through line 23. The gas stream passing through absorber section 21 is at a temperature of about 95°F and has a flow velocity of $2.5 \times 10^6$ lbs/hr, with a gas mass flow velocity of about 1,500 lbs/hr/ft².

The scrubbed gas stream passing upward from the top of absorber section 21 has its $SO_2$ content stripped to approximately 0.02 percent by volume, i.e., 200 ppm. The gas stream passes from absorber section 21 into water wash or scrubber section 22 of column 20 at the indicated flow rate for continued upward passage therethrough countercurrent to a descending stream of wash water introduced into the top of scrubber section 22 through line 24 at a temperature of about 95°F and at a flow rate of 155,000 lbs/hr. Most of the N-methyl pyrrolidone vaporized or entrained in the scrubbed gases passing from absorber section 21 to scrubber section 22 is recovered by the water therein. The washed gases removed from the top of scrubber section 22, therefore, not only have $SO_2$ stripped therefrom sufficiently to permit non-polluting discharge of the gas stream to the atmosphere with a greatly reduced, and tolerable, loss of N-methyl pyrrolidone in the gas stream discharged to the atmosphere.

Aqueous N-methyl pyrrolidone removed from absorber section 21 through line 27, at a temperature of about 110°F, passes through heat exchanger 28 and is introduced into distillation column 30 where it is heated by indirect heat exchange with steam at 450 psi in coil 38 so that $SO_2$ and water are stripped or distilled off from said solution through line 31.

An N-methyl pyrrolidone rich stream is removed from the bottom of distillation column 30 at approximately 350°F through line 23 and passes through said heat exchanger 28 and heat exchanger 35, whereby it is cooled to a temperature of about 95°F before being introduced into the top of absorber section 21 of column 20. The $SO_2$ and water removed from column 30 pass through partial condenser 32 to accumulator 33 from which liquid water for reflux is passed back into column 30. The $SO_2$ and water vapor leaving accumulator 33 are compressed to a pressure of about 100 psig in compressor 37 and are cooled to about 80°–90°F in cooler 47 before entering the second distillation zone, namely column 40, at a rate of about 35,000 lbs/hr through line 51. Water stripped of $SO_2$ is removed from the bottom of still 40 through line 42 at a temperature of about 325°F and a rate of about 154,000 lbs/hr.

$SO_2$ is removed from the top of still 40 through line 43 at a temperature of about 110°F and is condensed in condenser 44 at about 80°–90°F at 75 psig. A portion of the liquid $SO_2$ thereby obtained is recirculated to still 40 for reflux, and the remainder is removed to storage as essentially pure liquid $SO_2$, having a purity of 90–95 percent, through line 53.

EXAMPLE 2

The process of the present invention was carried out in pilot plant apparatus substantially as shown in the drawing with sulfur dioxide impurities in flue gases being stripped by means of N-methyl pyrrolidone from a stack gas composition containing said sulfur dioxide, air, carbon dioxide, nitrogen and water vapor. Various runs were conducted with the inlet gas temperature varying from 975° to 1,225°F, the average temperature of the absorber varying from 75° to 90°F. In such pilot plant runs, the flue gases were introduced into the absorber without previous cooling.

The absorber utilized in carrying out these experiments was a 4 inch inside diameter absorber containing 15 inches of ¼ inch glass Raschig ring packing, providing four calculated theoretical plates. Provisions were made for passing a lactam stream having $SO_2$ dissolved therein from the absorber to a stripping column comprising a 2 inches inside diameter stripping column mounted on top of a main reboiler, such column containing 15 inches of ¼/ring packing below the feed and a small amount of stainless steel gauze above the feed.

This column stripped away excess water, sulfur dioxide, a small amount of carbon dioxide and inert gases into a reflux condenser that separated a very small recycle vapor before feeding the excess reflux to a small fractionator. The solvent employed in carrying out these experiments was N-methyl pyrrolidone containing water in an amount of from about 10 percent to about 35 percent by weight. The following table illustrates the results of the test conducted as above, indicating in the last column thereof, the percent of sulfur dioxide absorbed from the gas stream by the N-methyl pyrrolidone solvent:

TABLE

| Temperatures | | ° F. avg. absorber | Std. cu. ft. gas flow per minute | Percent $H_2O$ in solvent | # solution circulated/ hr. | Mol percent $SO_2$ in inlet | # mols. liq./hr. L | # mols vapor/hr. V | $K_{SO_2}$ =Y/X | $\frac{L}{VK}$ | Percent $SO_2$ absorbed |
|---|---|---|---|---|---|---|---|---|---|---|---|
| Inlet gas | Reboiler | | | | | | | | | | |
| 1,150 | 242 | 90 | 2.0 | 15.7 | 23.1 | 0.052 | 0.337 | 0.317 | 1.0 | 1.06 | 85.0 |
| 975 | 223 | 80 | 1.72 | 35.0 | 30.8 | 0.096 | 0.802 | 0.272 | 3.6 | .82 | 70.0 |
| 1,000 | 235 | 75 | 2.29 | 20.0 | 24.9 | 0.097 | 0.477 | 0.363 | 1.7 | .77 | 84.0 |
| 1,220 | 233 | 83 | 1.27 | 18.0 | 20.3 | 0.109 | 0.370 | 0.201 | 1.0 | 1.84 | 92.3 |
| 1,170 | 233 | 83 | 1.27 | 18.0 | 14.3 | 0.109 | 0.262 | 0.201 | 1.0 | 1.3 | 89.6 |
| 1,100 | 258 | 85 | 2.0 | 10.5 | 20.4 | 0.098 | 0.298 | 0.317 | 0.53 | 1.77 | 80.0 |

As can readily be seen from the above table, all of the experimental runs conducted in the pilot apparatus in accordance with the process of the present invention allow for a very effective absorption and stripping of the sulfur dioxide from the stack gas containing the same. It should be noted, however, that where the water content of the N-methyl pyrrolidone solvent was greater than about 25 percent, a somewhat lower percentage absorption was observed. Ease of operation and selectivity of the solvent for the sulfur dioxide indicate that the moisture content, or water content of the solvent should be generally less than about 25 percent, as under the conditions of the experimental run at a range of about 15 to 20 percent by weight.

Again, it is pointed out that the above experiment clearly indicates that the N-alkyl lactam is capable of selectively absorbing and stripping sulfur dioxide from a mixture of gases containing the same. This is of particular importance in that the reduction of sulfur dioxide contaminants in the air is now extremely essential in light of the great concern and growing awareness about air pollution and the necessity for environmental controls. By employing the process of the present invention, an industrial complex engaged in the combustion of high sulfur-containing fuels can accommodate the concern about air pollution by assuring that the sulfur dioxide contaminants of waste gas streams are stripped therefrom so as not to be discharged to the atmosphere in quantities considered to be of a polluting nature under the applicable air pollution control regulations.

EXAMPLE 3

Runs essentially as in Example 1 in which the N-methyl pyrrolidone solvent is replaced with substantially equivalent amounts of the N-alkyl lactams set forth below provide substantially equivalent results, i.e., substantially equivalent selective absorption and stripping of sulfur dioxide from a gas stream being treated. Illustrative additional lactams include: N-ethyl pyrrolidone, N-p-butyl pyrrolidone, N-isooctyl pyrrolidone, and N-isopropyl piperidone. The employment of such additional N-alkyl lactams further illustrates the selectivity of the process of the present invention for stripping sulfur dioxide from a mixture of gases containing the same, and thus illustrates the great importance of the process of the present invention with respect to the elimination of the air pollution problems associated with the disposal of industrial gas streams containing sulfur dioxide.

The commercial significance of the present invention is further illustrated in the following examples of various embodiments of the invention carried out in accordance with the description of the invention as hereinabove set forth and as illustrated in the accompanying drawing.

EXAMPLE 4

A roaster gas stream from a sulfur smelting operation has a composition essentially of 84 percent nitrogen, 8 percent oxygen and 8 percent sulfur dioxide, expressed as percent by volume. This gas stream is cooled from about 160°C to about 65°C by heat exchange with the heating medium for the lactam regeneration still and with the lactam stream having $SO_2$ dissolved therein passing from the absorption zone to the lactam regeneration zone. The cooled gas is passed to the absorption zone, e.g., section 21 of column 20 of the drawing, at a gas mass flow velocity of about 1,500 lbs/hr/ft². The absorption zone comprises a packed column 12 ft in height packed with Raschag rings and similar ring-type contact surfaces. The packed column contains liquid N-methyl pyrrolidone solvent passing downwardly in the packed absorption zone for countercurrent contact with the ascending gas stream. Regenerated lactam is recycled to the column through line 23, and a lactam stream having $SO_2$ dissolved therein is withdrawn through line 27. A recycle rate of regenerated lactam of about 24 gals of lactam per MCF of gas gassing through the absorption zone is maintained. A 5 percent water content by weight is maintained in the lactam-rich stream fed from distillation zone 30 to absorption zone 21 by operating the distillation zone at about 150°C and 5 psig. The water in scrubber zone 22, into which the gas stream passes directly from absorption zone 21, is maintained at about 65°C. The scrubber zone comprises 4 ft of packing, i.e., the same ring-type contact packing surfaces as employed in the absorption zone. Water is fed to said scrubber zone 22 through line 24 at the rate of ¼ gal/MCF of treated gas passing therethrough. A water stream having lactam contained therein is withdrawn from scrubber zone 22 through line 20 for passage, together with the lactam stream in line 27, to distillation zone 30. The treated gas passing from column 20 for discharge to the atmosphere is found to have about 99.4 percent by volume of its sulfur dioxide impurity contents scrubbed therefrom, the discharged gas stream having an $SO_2$ content of about 500 ppm. The appreciable quantities of $SO_2$ thus removed from the gas stream and distilled off in distillation zone 30 can thereupon be recovered in aqueous solution and can be distilled therefrom, if desired, to obtain an essentially pure liquid $SO_2$ product. The treated gas stream, having a very substantial portion of its $SO_2$ content stripped therefrom, can be further treated, if desired, for non-polluting discharge to the atmosphere or can otherwise be processed in any desired manner. The treated gas stream upon leaving the scrubber zone will have about 99 percent of the lactam accompanying said stream upon passage into the scrubber zone removed therein, so that an unacceptable loss of lactam in the discharged gas stream is avoided.

EXAMPLE 5

A stack gas stream resulting from the combustion of sulfur-containing fuel, is processed in a manner centrally as set forth in Example 4. The incoming stack gas to be treated in accordance with the present invention has a composition, expressed in percent by volume, as follows: $CO_2$ 15%, $H_2O$ 8.2%, $O_2$ 1.8%, $SO_2$ 0.5%, with the balance comprising nitrogen. This gas stream, cooled to 55°C, is passed into an absorption zone having a bubble plate construction with 2 ft plate spacing and six actual contact trays or plates, with a plate efficiency of about 30–40 percent. The gas mass flow velocity through the absorption zone is 1,300 lbs/hr/ft². The thus treated stack gas passes directly from absorption section 21 into scrubber section 22 of the gas-liquid contact column, wherein the gas is scrubbed with water in a two-plate scrubber zone with said 2 ft spacing.

N-methyl pyrrolidone is employed as the N-alkyl lactam solvent in the absorption zone, said lactam having a water content of about 5 percent by weight. Regenerated lactam is recycled to said absorption zone at a rate of 8.7 gals/MCF, i.e., per 1,000 ft³, of gas being treated. The water flow rate in the scrubber zone maintained at about 0.25 gal per MCF of gas passing therethrough. Ninety-nine percent of the $SO_2$ impurity content of the stack gas is stripped therefrom so that the treated gas stream discharged to the atmosphere contains only 50 ppm of $SO_2$. Essentially all of the lactam vaporized or entrained in the stack gas passing from the absorption zone into the scrubber zone is recovered therein so as to minimize the amount of lactam lost in the discharged gas stream.

EXAMPLE 6

A gas stream having an $SO_2$ content of about 0.05 percent is treated as in Example 5 to strip about 99.0 percent of the $SO_2$ impurities therefrom. Upon passing through the scrubber zone for contact with water therein, the treated gas stream is permitted to pass in non-polluting discharge to the atmosphere with an $SO_2$ content of only 5 ppm. In this gas treating operation, the gas temperature in the absorption zone is 45°C, and the gas mass flow velocity is 1,500 lbs/hr/ft². The absorption zone and the scrubber zone employed comprise the lower and upper portions of a packed column, the absorption zone being 6 ft in height and the scrubber zone 2 ft in height. A solvent recycle rate of 8.5 gals/MCF of gas being treated, the recycled lactam to the absorption zone having a water content of about 5 percent. The water flow rate to the scrubber zone is maintained at about 0.2 gal/MCF of gas passing through the treating column. Over 98 percent by weight of the vaporized and entrained lactam is removed from the gas stream during passage through the scrubber zone.

EXAMPLE 7

A roaster gas stream, such as in Example 4, has about 99.8 percent of its sulfur dioxide impurity content stripped therefrom upon contact, at about 60°C, with N-alkyl lactam, i.e., N-methyl pyrrolidone, in a bubble tray absorption zone. A total of eight actual trays is employed with a 2 ft spacing, the tray efficiency being about 30–40 percent. Three actual trays with said 2 ft spacing are employed in the scrubber zone. The gas mass flow velocity through the absorption zone and through the water scrubber zone is 1,250 lbs/hr/ft². A solvent recycle rate of 9.5 gals/MCF of treated gas is maintained in the absorption zone, the water flow rate in the scrubber zone being 0.2 gal/MCF of treated gas.

The water content of the solvent in the absorption zone is about 4.7 percent by weight. The roaster gas has its $SO_2$ content reduced, therefore, some 8 percent to 100 ppm in the stripping operation of the present invention. Minimal loss of lactam in the discharged gas stream is sustained, the water in the scrubber zone recovering over 99 percent of the lactam vaporized or entrained in the gas stream passing therethrough, the lactam thus removed from the scrubber zone in the water stream passing therefrom being regenerated in the lactam distillation zone for recycle to the absorption zone.

EXAMPLE 8

A combustion stack gas having an $SO_2$ impurity content of about 0.5 percent by volume is treated by contact with N-methyl pyrrolidone in a packed absorption column to remove about 99.9 percent of the $SO_2$ impurities, the treated gas stream being discharged to the atmosphere with an $SO_2$ content of 5 ppm. For this essentially complete stripping of the $SO_2$ impurities, the packed column employed has a height of about 10 ft, and the gas mass flow velocity therethrough is maintained at 1,500 lbs/hr/ft². The temperature of the gas passing through the absorption zone is 65°C, rich lactam being passed therefrom to a distillation zone for heating therein under reflux at about 110°C. A regenerated lactam stream having 15 percent water by weight is cooled and recycled to the absorption zone at the rate of 7.2 gals/MCF of stack gas passing through the absorption zone. The scrubber zone comprises a packed column about 4 ft in height. Essentially all of the vaporized and entrained lactam in the treated gas passing upwardly from the absorption zone is removed from the gas by the water in the scrubber zone, said water, at 0.25 gal/MCF of stack gas, being passed to the distillation zone for recovery of the lactam content thereof.

In further illustrative examples of the remarkable $SO_2$ stripping obtainable in the practice of the invention, other N-alkyl lactams of the type indicated above can be employed in place of the generally preferred N-methyl pyrrolidone. Higher molecular weight N-alkyl solvents are, of course, higher boiling and less volatile than N-methyl pyrrolidone. As noted above, however, N-methyl pyrrolidone has a relatively low vapor pressure and can be regenerated substantially without loss in the distillation zone. As the lactam vaporized or entrained in the treated gas can, in addition, be substantially completely recovered in the scrubber zone, no significant advantage is obtained in this regard in the use of other N-alkyl lactams in place of N-methyl pyrrolidone. As the $SO_2$ stripping power of N-methyl pyrrolidone is particularly impressive, the use of N-methyl pyrrolidone is generally preferred in the practice of the invention, although, of course, other indicated alkyl lactams can also be employed. When utilizing N-cyclohexyl pyrrolidone for the $SO_2$ stripping of the invention, it is generally desirable to employ a somewhat faster solvent recycle rate and a lower water content than would be employed in a similar application utilizing N-methyl pyrrolidone as the $SO_2$ stripping solvent. The solvent recycle rate for N-cyclohexyl pyrrolidone will, advantageously be from about 1.5 to about 1.75, e.g., about 1.7, times the recycle rate for N-methyl pyrrolidone. While water can be tolerated in the absorption zone within the rather wide limits indicated, the water content will advantageously be from about 2 percent to about 5 percent, preferably about 3 percent, in many applications where a very high degree of stripping is desired utilizing N-cyclohexyl pyrrolidone as the stripping solvent. As the process of the invention is operable over wide limits of $SO_2$ impurity content, degree of stripping, temperatures and other conditions, however, it will be understood that the optimum conditions applicable in any given application will depend upon the particular conditions pertaining to that application. Various other processing modifications can be made to achieve optimum operating conditions. For example, excess heat available in the incoming gas stream can also be employed to supply heat for operation of the second distillation zone, i.e., $SO_2$ still 40.

In continuous gas treating operations, lactam having $SO_2$ dissolved therein will be withdrawn from the absorption zone on a generally continuous basis with regenerated lactam being recycled from the distillation zone to the absorption zone at a rate generally within a range on the order of about 5 to about 40 gallons of lactam solvent per MCF of gas being treated. It will be appreciated that the effectiveness of $SO_2$ stripping is generally increased by increasing the solvent recycle rate. When a water scrubber zone of the type indicated is employed to minimize loss of lactam in the discharged gas stream, the water stream containing dissolved lactam is withdrawn from the scrubber and a water stream is fed to the scrubber also generally on a continuous basis, the rate being much less than that of solvent recycle as the water requirements for minimizing loss of lactam are relatively small. A water flow rate generally on the order of about 0.05 to about 0.25 gallons per MCF of gas being treated is sufficient in most applications provided that an appropriate size scrubber zone is provided. It is within the scope of the invention, however, to provide for larger water flow rates with rates generally ranging from about 0.05 to about 2.0 gals per MCF of gas treated being sufficient and satisfactory for the desired lactam recovery. As previously indicated, however, the particular processing limitations employed in any given application will depend upon the degree of $SO_2$ stripping necessary or desired in any particular application and the particular operating conditions and materials employed in that application. In this regard, it should also be noted that, in some applications, a gas stream being treated in the absorption zone will be subject to more than one such stripping operation as described above to achieve a desired ultimate level of $SO_2$ stripping. If practical, a somewhat larger absorption zone or mass flow rates outside the precise limits herein set forth may be employed to achieve sufficient $SO_2$ stripping for non-polluting discharge to the atmosphere or other disposal or use of the treated gas stream. In other applications, a gas stream may have a relatively low $SO_2$ content, e.g., 150–300 ppm, that is nevertheless to be reduced to an applicable air pollution control specification of, for example, 100 ppm. Likewise, a gas stream may have an $SO_2$ content of about 500 ppm that is to be reduced in the absorption zone to about 250 ppm for non-polluting disposal, an efficiency of stripping in said absorption zone of only about 50 percent being required in this instance. Although the present invention is capable of a highly remarkable and unexpected degree of $SO_2$ stripping, as herein indicated, it is also within the scope of the invention to treat such gas streams under such less stringent requirements of recycle rate, temperature, water content and the like as to achieve the more limited $SO_2$ stripping required for conformance with the applicable standards even though the invention could be utilized to achieve a higher degree of $SO_2$ stripping if more restrictive standards or an overriding environmental concern were to compel such a greater utilization of the invention.

Economic considerations will, of course, ordinarily encourage the practice of the invention with minimum capital costs, and lactam, water and utility requirements. It will be understood, however, that in continuous commercial operations where environmental concerns and regulatory requirements make necessary the continuing adherence to emission control standards without, at the same time, undesired interruption of normal operations, a prudent safety factor will ordinarily be employed to assure successful, continuous operations. Minor mechanical problems causing less than desired pumping or heat exchange capability, and the like, are thus capable of being tolerated without the necessity for costly, unscheduled shut-downs or turnovers interfering with efficient and continuous gas treating operations. In the practice of the invention, therefore, an excess number of equilibrium stages, e.g., bubble trays or length of packed column, will ordinarily be employed over and above that suggested by the theoretical plates requirements, tray efficiencies and the like as discussed above. For appropriate safety factor purposes, the number of actual trays or height of column employed, particularly in the absorption zone, may be increased by up to about 50 percent excess or more, even up to 100 percent, to assure adequate stripping on a continuous basis despite peripheral operating handicaps that may occasionally be encountered. It is a measure of the striking efficiency of the stripping capabilities achieved in the practice of the invention that such ample safety factors can be employed while remaining within the practical, commercially feasible size and operating limitations disclosed and claimed herein. Accordingly, bubble tray absorption zones in continuous commercial operations under the invention will often be at least about 20 ft in length, and in many practical applications, at least about 40 ft in length, because of such practical considerations for successful continuous operations of a commercial plant. It is also within the scope of the invention to practice the present invention by passing the gas stream to be treated through two or more separate absorption zone columns or towers, the overall height of the combination of absorption zone columns being generally within the limits hereinabove set forth with respect to a single such column. In this embodiment, rich lactam solvent having $SO_2$ dissolved therein can be withdrawn from the bottom portion of each column, with fresh regenerated lactam being introduced into the upper portion thereof for descending passage in counter-current contact with the ascending stream of gas to be treated. Alternately, a rich lactam stream having $SO_2$ dissolved therein can be withdrawn from the bottom of one such absorption column and introduced into the upper portion of the next column of a series of two or more such separate columns. In this embodiment, the rich lactam stream removed from the last of such a series of columns would be passed to the distillation zone for regeneration of the lactam solvent by removal of the $SO_2$ dissolved therein. In another embodiment, a single absorption zone column may have regenerated solvent introduced not only at the upper portion as described above, but at one or more intermediate points along the column height. It is also within the scope of the invention to enhance the efficiency of the stripping operation by employing an absorption zone of given, practical size, with two, three or more separate stages each with its own separate lactam solvent introduction point and draw-off point for lactam having $SO_2$ dissolved therein. In this embodiment, the separate lactam streams withdrawn from each stage can be fed to a common distillation or regeneration zone. Likewise, the lactam-rich stream from said distillation zone can be recycled to each of the separate solvent introduction points on the column. It will be understood that each stage of the overall zone or column need not be operated for maximum $SO_2$ stripping efficiency, but that the flexibility of the invention is further enhanced in meeting any desired degree of overall $SO_2$ stripping. For example, an absorption zone having an overall height within the practical, commercially feasible limit recited herein may have three separate draw-off sections. If the first two stages were thus operated to achieve 90 percent $SO_2$ stripping and the third stage, treating a gas stream having a very greatly reduced $SO_2$ content, were operated at only 70 percent removal, the overall treatment would effect a 99.7 percent removal of the $SO_2$ content of the gas stream passing through the absorption zone. This embodiment, therefore, enhances the ready achievement of extremely high levels of $SO_2$ removal in accordance with the present invention as disclosed and claimed herein.

The present invention thus provides a highly effective, commercially attractive technique for stripping $SO_2$ from gas streams. The invention is not only compatible with desired or prospective $SO_2$ specifications for air pollution control, but offers a genuine opportunity for lowering such specifications and enhancing the recovery of $SO_2$ from gas streams discharged to the atmosphere. In addition to the high degree of $SO_2$ stripping achieved in the practice of the invention, over an acceptable range of operating conditions, the sharp decrease in $SO_2$ solubility with temperature permits a ready regeneration of the N-alkyl lactam for recycle and reuse. As the N-alkyl lactam solvent can readily withstand the operating temperatures required in the regeneration operation without degradation and the loss of solvent in the overall operation can be minimized, the present invention is of great importance as a means for overcoming the problem of sulfur dioxide emissions resulting from industrial gas disposal. The attractiveness of the invention is enhanced by the ability to recover the stripped $SO_2$ in a usable form, particularly in the form of an essentially pure liquid $SO_2$ product. The latter product, in convenient form for non-polluting handling, storage and use, provides a desirable by-product of the $SO_2$ stripping operation, capable of use in the low cost production of sulfuric acid and other sulfur containing products.

A highly significant feature of the present invention resides in its inherent flexibility as shown above. This flexibility enables the invention to be utilized to readily satisfy present or prospective $SO_2$ emission standards and to further meet even more restrictive standards as they become applicable without the necessity for a basic redesign of the emission control system. The present invention also enables dual pollution control standards, presently contemplated, to be satisfied. Such standards, for example, would require not only that a certain $SO_2$ ppm level be reached for atmospheric discharge, but that a high degree of stripping consistent with available technology be achieved. A gas stream having about 500 ppm, under such standards, might be required not only to be stripped to 250 ppm as an upped, generally applicable level, but might also be required to have at least about 90 percent, or 95 percent or higher $SO_2$ removal prior to discharge to the atmosphere. The present invention provides a highly attractive technique for meeting such dual standards, with continuous operation of an existing unit being capable of achieving increased levels of stripping, as by increased solvent recycle rates, without being outmoded by more restrictive pollution control standards adopted after the installation of such a unit. As the stripping of additional quantities of $SO_2$ from a gas stream already containing a relatively low $SO_2$ content is generally known to be more difficult than the same percentage removal at a higher $SO_2$ level, it will be appreciated that the present invention is of major importance with respect to a problem of immediate and urgent concern throughout the industrial world.

It will be appreciated that various changes and modifications can be made in the overall process herein disclosed without departing from the scope of the invention as hereinafter set forth in the appended claims.

Therefore, we claim:

1. A process for treating a gas stream containing sulfur dioxide impurities to enable said stream to be discharged to the atmosphere without undersired sulfur contamination thereof comprising:
   a. contacting a gas stream containing from about 0.05 percent to about 10% $SO_2$ by volume with a liquid N-alkyl lactam solvent in a contacting zone at a gas temperature of from about 0°C to about 75°C at a pressure assuring the flow of said gas stream through the contacting zone at a gas mass flow velocity of from about 200 to about 3,000 lbs/hr/ft$^2$, the contacting zone having a length of from about 5 ft. to about 85 ft., and
   b. discharging the thus-treated gas stream to the atmosphere, said discharged stream having a sulfur dioxide impurity content of not more than about 250 ppm, whereby the N-alkyl lactam washes said sulfur dioxide impurities from the gas stream sufficiently to permit the non-polluting discharge of said gas stream to the atmosphere, said sulfur dioxide impurities absorbed in said N-alkyl lactam being conveniently available for non-polluting disposal or use.

2. The process of claim 1 in which said sulfur dioxide impurities in the discharged gas stream comprise less than about 100 ppm.

3. The process of claim 2 in which said sulfur dioxide impurity concentration in the discharged gas stream is from about 50 ppm to about 100 ppm.

4. The process of claim 2 in which said sulfur dioxide impurity concentration in the discharged gas stream is from about 5 ppm to about 50 ppm.

5. The process of claim 1 in which said gas temperature is from about 35°C to about 65°C.

6. The process of claim 5 in which the sulfur dioxide content of the untreated gas stream is from about 0.1 percent to about 8 percent by volume.

7. The process of claim 6 in which said sulfur dioxide content of the untreated gas stream is from about 0.1 percent to about 0.5 percent by volume.

8. The process of claim 7 in which the sulfur dioxide impurities in the discharged gas stream comprise less than about 100 ppm.

9. The process of claim 6 in which said contacting zone has a length of at least about 10 ft.

10. The process of claim 5 in which said lactam is N-methyl pyrrolidone.

11. The process of claim 5 in which said lactam is N-cyclohexyl pyrrolidone.

12. The process of claim 5 in which said liquid lactam comprises an aqueous solution thereof.

13. The process of claim 12 in which said aqueous solution contains from about 2 percent to about 25 percent water by weight.

14. The process of claim 13 in which said water content is from about 15 percent to about 25 percent by weight of said lactam solution.

15. The process of claim 13 in which said water content is from about 2 percent to about 10 percent by weight.

16. The process of claim 5 in which the sulfur dioxide content of the untreated gas stream is from about 0.1 percent to about 8 percent by volume, the sulfur dioxide impurities in the discharged gas stream comprising less than about 100 ppm, said contacting zone being at least about 10 ft. in length.

17. The process of claim 16 in which said N-alkyl lactam comprises N-methyl pyrrolidone.

18. The process of claim 1 and including removing the N-alkyl lactam having sulfur dioxide absorbed therein from the contacting zone and heating to from about 100°C to about 200°C to strip said sulfur-dioxide-containing gases therefrom and thereafter recycling said N-alkyl lactam to said contacting zone for contact with additional quantities of said sulfur dioxide contaminated gas stream, the stripped sulfur dioxide gases being utilized in the production of sulfur-containing compounds for subsequent use or non-polluting disposal.

19. The process of claim 18 in which said lactam is an N-lower alkyl pyrrolidone.

20. The process of claim 19 in which said lactam comprises N-methyl pyrrolidone.

21. The process of claim 20 in which said gas temperature is from about 35°C to about 65°C.

22. The process of claim 21 in which said sulfur dioxide-contaminated gas stream is at an elevated temperature above about 65°C and including cooling said gas stream to from about 35°C to about 65°C prior to contact thereof with said liquid lactam, said gas mass flow velocity being from about 1,000 to about 2,000 lbs/hr/ft$^2$.

23. The process of claim 22 in which the sulfur dioxide concentration in the treated gas stream discharged to the atmosphere is from about 50 ppm to about 100 ppm, said contacting zone being at least about 20 ft. in length, said lactam comprising an aqueous solution thereof containing up to about 25 percent water by weight of solution.

24. The process of claim 23 in which said lactam comprises an aqueous solution thereof containing from about 2 percent to about 10 percent water by weight of solution.

25. A process for treating a gas stream containing sulfur dioxide impurities comprising:
   a. contacting an incoming gas stream containing from about 0.01 percent to about 50 percent sulfur dioxide by volume with a liquid N-alkyl lactam solvent in a contacting zone at a gas temperature of from about 0°C to about 75°C at a pressure assuring the flow of said gas stream through the contacting zone at a gas mass flow velocity of from about 200 to about 3,000 lbs/hr/ft², the contacting zone having a length of from about 5 ft. to about 85 ft.; and b. discharging the thus-treated gas stream from the contacting zone, said stream having a sulfur dioxide content of not more than about 10 percent by volume of the sulfur dioxide content of the untreated gas stream, at least about 90 percent by volume of said sulfur dioxide impurities of the untreated gas stream being removed therefrom by absorption in said N-alkyl lactam, whereby the sulfur dioxide impurities are very substantially washed from the gas stream containing same, the sulfur dioxide impurities being conveniently available for non-polluting disposal or use.

26. The process of claim 25 in which at least about 95 percent of the sulfur dioxide impurities are removed from the incoming gas stream by absorption in said N-alkyl lactam, said gas temperature being from about 35°C to about 65°C.

27. The process of claim 26 in which at least about 98 percent of the sulfur dioxide impurities are removed from the incoming gas stream by absorption in said N-alkyl lactam.

28. The process of claim 25 in which said sulfur dioxide content of the untreated gas stream is from about 0.1 percent to about 0.5 percent by volume, at least about 95 percent of the sulfur dioxide impurities being removed from the incoming gas stream by absorption in said N-alkyl lactam, said gas temperature being from about 35°C to about 65°C.

29. The process of claim 28 in which said lactam comprises N-methyl pyrrolidone containing up to about 25 percent water by weight.

30. The process of claim 29 in which said aqueous solution contains from about 2 percent to about 10 percent water by weight.

31. The process of claim 25 in which said sulfur dioxide-containing gas stream is at a temperature above about 65°C and including cooling said gas stream to from about 35°C to about 65°C prior to contact thereof with said liquid lactam and including heating lactam removed from the contacting zone to from about 100°C to about 200°C to strip said sulfur dioxide-containing gases therefrom and thereafter recycling said N-alkyl lactam to said contacting zone for contact with additional quantities of said sulfur dioxide contaminated gas stream, the stripped sulfur dioxide gases being thereafter compressed and recovered for non-polluting disposal or use.

32. The process of claim 31 in which said contacting zone has a length of at least about 20 ft.

33. The process of claim 32 in which said lactam comprises N-cyclohexyl pyrrolidone.

34. The process of claim 32 in which said lactam comprises N-methyl pyrrolidone, said lactam removing at least about 95 percent by volume of the sulfur dioxide impurities contained in the incoming gas stream.

35. The process of claim 34 in which said lactam removes at least about 98 percent by volume of the sulfur dioxide impurities contained in the incoming gas stream, said absorption zone being at least about 40 ft. in length.

36. The process of claim 35 in which said gas mass flow velocity is from about 1,000 to about 2,000 lbs/hr/ft².

* * * * *